United States Patent
Li et al.

(10) Patent No.: US 8,479,279 B2
(45) Date of Patent: Jul. 2, 2013

(54) SECURITY POLICY ENFORCEMENT FOR MOBILE DEVICES CONNECTING TO A VIRTUAL PRIVATE NETWORK GATEWAY

(75) Inventors: Hao Li, Northborough, MA (US); Seung Bong Han, Tracy, CA (US)

(73) Assignee: Avaya Inc., Basking Ridge, NJ (US)

( * ) Notice: Subject to any disclaimer, the term of this patent is extended or adjusted under 35 U.S.C. 154(b) by 66 days.

(21) Appl. No.: 13/215,290

(22) Filed: Aug. 23, 2011

(65) Prior Publication Data

US 2013/0055336 A1 Feb. 28, 2013

(51) Int. Cl.
*G06F 17/00* (2006.01)
(52) U.S. Cl.
USPC .................................. 726/15; 726/1
(58) Field of Classification Search
None
See application file for complete search history.

(56) References Cited

U.S. PATENT DOCUMENTS

| | | | | |
|---|---|---|---|---|
| 6,968,394 | B1* | 11/2005 | El-Rafie | 709/245 |
| 2002/0032725 | A1* | 3/2002 | Araujo et al. | 709/203 |
| 2003/0177389 | A1* | 9/2003 | Albert et al. | 713/201 |
| 2003/0200202 | A1* | 10/2003 | Hsiao et al. | 707/3 |
| 2005/0257045 | A1* | 11/2005 | Bushman et al. | 713/156 |
| 2006/0004896 | A1* | 1/2006 | Nelson et al. | 707/206 |
| 2006/0085850 | A1* | 4/2006 | Mayfield et al. | 726/14 |
| 2006/0191005 | A1* | 8/2006 | Muhamed et al. | 726/15 |
| 2007/0156850 | A1* | 7/2007 | Corrion | 709/219 |
| 2007/0277013 | A1* | 11/2007 | Rexha et al. | 711/164 |
| 2008/0080493 | A1* | 4/2008 | Weintraub et al. | 370/389 |
| 2009/0059907 | A1* | 3/2009 | Sindhwani et al. | 370/354 |
| 2009/0282234 | A1* | 11/2009 | Faraboschi et al. | 713/2 |
| 2010/0125897 | A1* | 5/2010 | Jain et al. | 726/7 |
| 2011/0296486 | A1* | 12/2011 | Burch et al. | 726/1 |

* cited by examiner

*Primary Examiner* — Peter Poltorak
(74) *Attorney, Agent, or Firm* — Anderson Gorecki & Rouille LLP (57) ABSTRACT

A method, apparatus and computer program product for providing secure policy enforcement for mobile devices is presented. A mobile device is connected to a computer system, the computer system having an active Virtual Private Network (VPN) tunnel with a VPN gateway. The computer system runs a security policy check on the mobile device. A determination is made whether the mobile device passed the security policy check and when the mobile device does pass the security policy check, a certificate is issued to the mobile device. The mobile device then uses the certificate to connect to a VPN.

17 Claims, 6 Drawing Sheets

PRIOR ART

FIGURE 1

PRIOR ART

SECURITY POLICY ENFORCEMENT FOR MOBILE DEVICES CONNECTING TO A VIRTUAL PRIVATE NETWORK GATEWAY

BACKGROUND

A virtual private network (VPN) is a secure way of connecting to a private Local Area Network (LAN) at a remote location, using the Internet or any unsecure public network to transport the network data packets privately, using encryption. The VPN uses authentication to deny access to unauthorized users, and uses encryption to prevent unauthorized users from reading the private network packets. The VPN can be used to send any kind of network traffic securely, including voice, video or data.

VPNs are frequently used by remote workers or companies with remote offices to share private data and network resources. VPNs may also allow users to bypass regional Internet restrictions such as firewalls, and web filtering, by "tunneling" the network connection to a different region. Technically, the VPN protocol encapsulates network data transfers using a secure cryptographic method between two or more networked devices which are not on the same private network, to keep the data private as it passes through the connecting nodes of a local or wide area network.

Companies commonly use an endpoint access control (EAC) agent (also referred to as a status checking agent) in their VPN framework to enforce security policies on remote client devices. These EAC agents normally run as background services periodically reporting policy checking results back to the VPN gateway. One example of such an agent is the Avaya EAC Agent, available from Avaya, Inc. of Basking Ridge, N.J.

SUMMARY

Conventional mechanisms such as those explained above suffer from a variety of deficiencies. One such deficiency is that certain mobile devices don't allow third party background services running on their platforms. Another deficiency is that for certain mobile devices, local application has less access to the file system than the ones runs on connected machine. This makes it impossible to enforce company security policy on those devices. Further, mobile devices have limited memory size, Central Processing Unit (CPU) power, battery power and disk space. Performing frequent policy checking and reporting on these mobile devices would greatly consume these limited resources, and adversely impact the user's experience with the mobile devices.

Embodiments of the invention significantly overcome such deficiencies and provide mechanisms and techniques that provide for security policy enforcement on mobile devices connecting to a VPN gateway.

In a particular embodiment of a method for providing security policy enforcement on mobile devices connecting to a VPN gateway, the method includes connecting a mobile device to a computer system and running, by the computer system, a security policy check on the mobile device. The computer system has an active VPN tunnel with a VPN gateway. The method further includes determining whether the mobile device passed the security policy check and when the mobile device does pass the security policy check, issuing a certificate to the mobile device. Additionally, the method includes using the certificate by the mobile device when the mobile device connects to a Virtual Private Network (VPN).

Other embodiments include a computer readable medium having computer readable code thereon for providing security policy enforcement on mobile devices connecting to a VPN gateway. The computer readable medium includes instructions for connecting a mobile device to a computer system and running, by the computer system, a security policy check on the mobile device. The computer system has an active VPN tunnel with a VPN gateway. The computer readable medium further includes instructions for determining whether the mobile device passed the security policy check and when the mobile device does pass the security policy check, issuing a certificate to the mobile device. Additionally, the computer readable medium includes instructions for using the certificate by the mobile device when the mobile device connects to a Virtual Private Network (VPN).

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides security policy enforcement on mobile devices connecting to a VPN gateway as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing security policy enforcement on mobile devices connecting to a VPN gateway as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
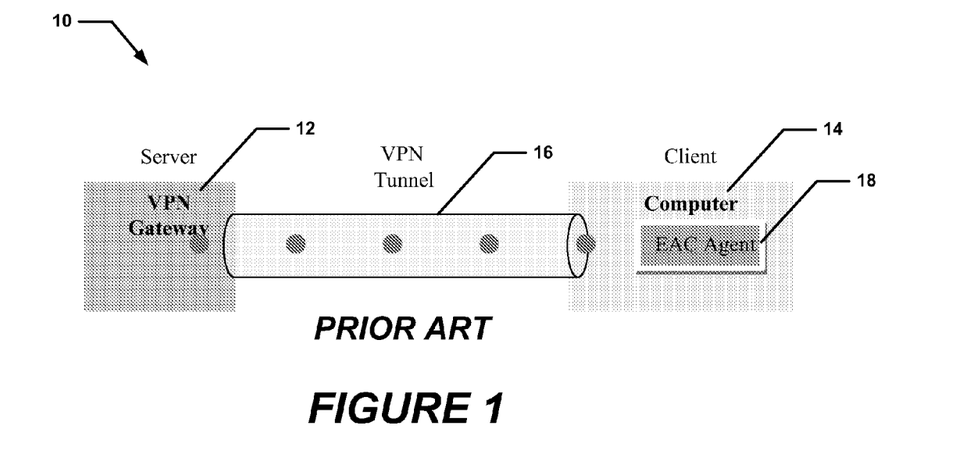
FIG. 1 illustrates a high level block diagram of a prior art VPN environment.

Referring to FIG. 1, a first prior art VPN environment 10 is shown. A computer system 14 is connected by way of a VPN tunnel 16 to a VPN gateway (also referred to herein as a VPN gateway) 12. As part of allowing the computer system 14 to access a VPN, companies commonly use an endpoint access control (EAC) agent 18 to enforce security policies on remote client devices 14. These agents 18 normally run as background services periodically reporting policy checking results back to the VPN gateway 12. This is done in an attempt to prevent the spread of nefarious software such as viruses and worms, and also used to check if the remote host's Operating system is supported, if certain settings (screen saver and etc.) is enabled, Antivirus/Firewall software are up to date, certain security updates are applied and etc. A computer system 14 is only allowed to use the VPN 16 if it has passed and continues to pass the security policy testing. The VPN 16 allows network data transfers using a secure cryptographic method between two or more networked devices which are not on the same private network.

Figure 2:
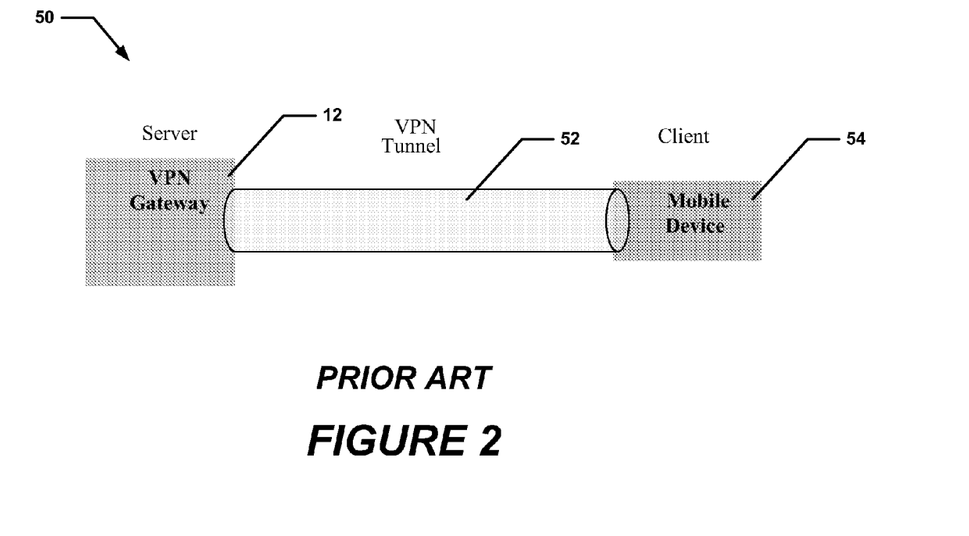
FIG. 2 illustrates a high level block diagram of a prior art VPN environment including a mobile device.

Referring now to FIG. 2, a second prior art VPN environment 50 is shown. Environment 50 is similar to environment 10 of FIG. 1 except that computer system 14 has been replaced by mobile device 54. Unfortunately, mobile device 54 does not have any type of security policy checking performed on it. One reasons for this may be because mobile devices typically have limited power, processing, memory and storage capabilities and performing security policy checking would consume the limited capabilities and provide a less than optimal experience. Another reason may be because the operating system of the mobile device may not allow background applications to be run on them. An additional reason is that application runs on mobile may not have access to certain part of the file system. Thus, the connection of mobile device 54 via VPN tunnel 52 to VPN gateway 12 may present a security risk, since no security policy checking is being performed.

Figure 3:
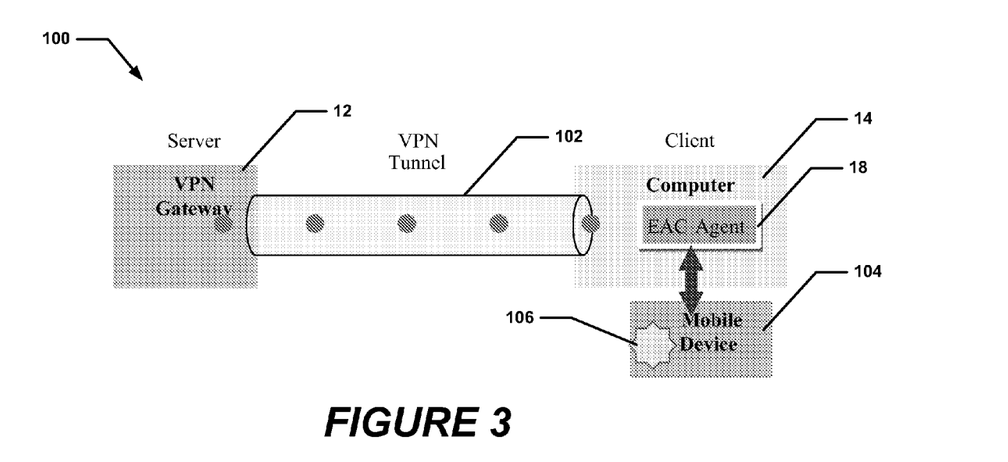
FIG. 3 illustrates a high level block diagram of a VPN environment including a computer system and a mobile device in accordance with embodiments of the present invention.

Referring now to FIG. 3, a third environment 100 is shown wherein a user has docked a mobile device 104 to a computer system 14. Computer system 14 is in communication via VPN 102 to VPN gateway 12. Computer system 14 has an EAC agent 18 running on it. Mobile device users often connect/dock their devices to computer systems. The policy checking agent 18 runs on the computer system 14 to check on the connected mobile device 104 while the computer system 14 has an active VPN tunnel 102 with the server (i.e. VPN gateway/router) 12. In this manner the security policy check is performed without taxing the limited resources of the mobile device 104. If the mobile device 104 passes the security policy check, the EAC agent 18 on computer system 14 will issue a certificate 106 to the mobile device 104. The certificate 106 contains encrypted information of the user's account, time stamp of the security policy checking, device specific information, and the like.

Figure 4:
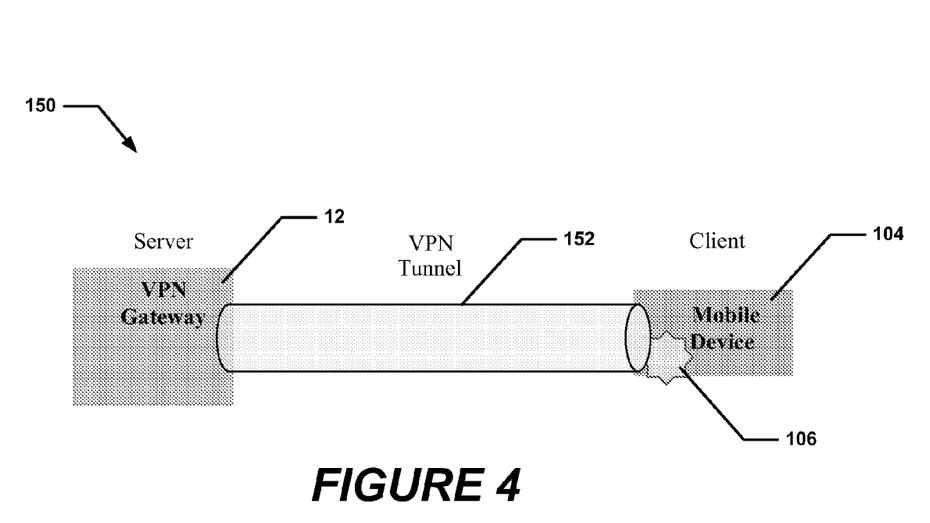
FIG. 4 illustrates a high level block diagram of a VPN environment including a mobile device in accordance with embodiments of the present invention.

Referring now to FIG. 4, a fourth environment 150 is shown. This environment is similar to the environment 50 of FIG. 2, except that mobile device 104 now has certificate 106. When the mobile device 104 tries to connect to the server (i.e. VPN gateway/router) 12, it only needs to present the certificate 106 to the VPN gateway 12 as a proof that the mobile device 104 has been checked. The server 12 will validate the certificate 106 based on the certificates content and the server's policy. A VPN 152 can then be instantiated between the mobile device 104 and the VPN gateway 12 with the knowledge that the mobile device 104 has been checked and passed the security policy checking.

Figure 5:
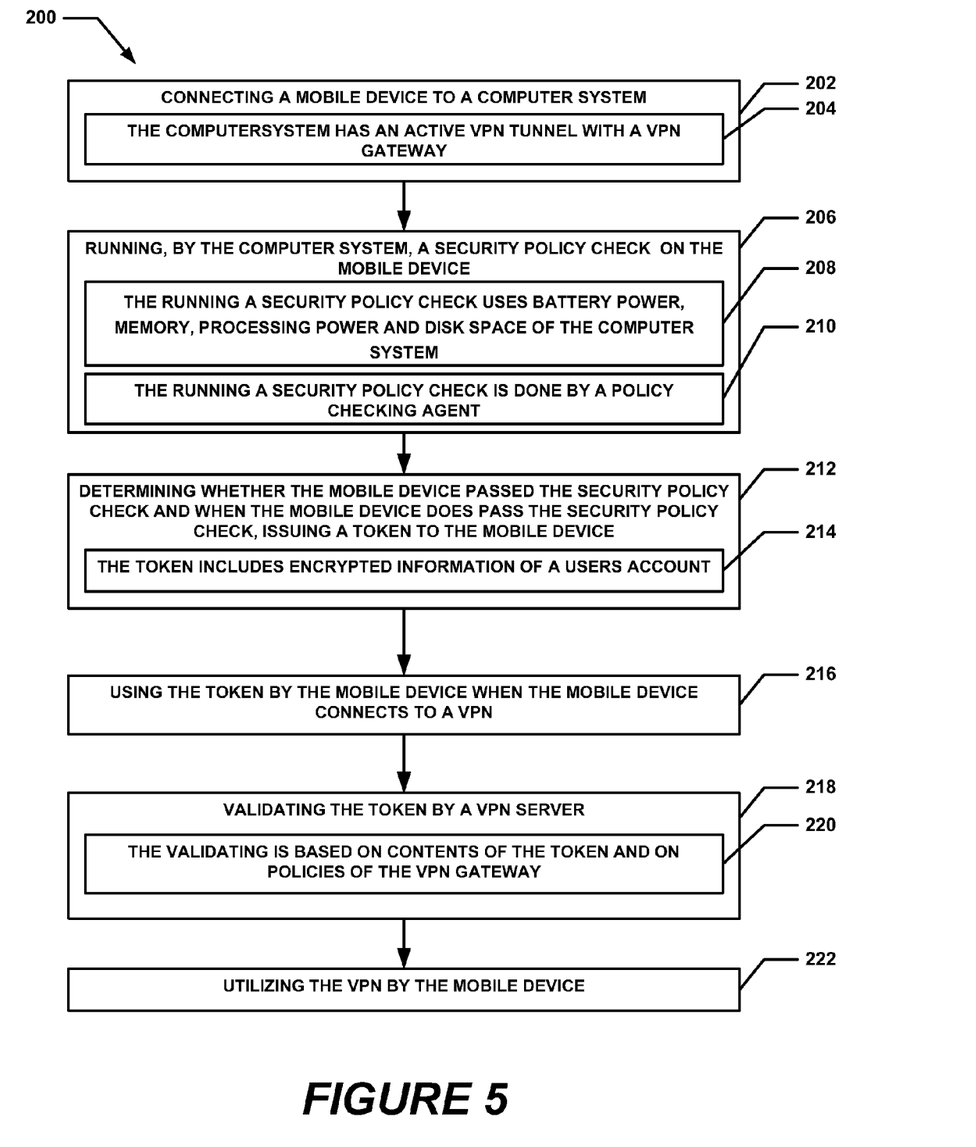
FIG. 5 depicts a flow diagram of a particular embodiment of a method for providing security policy enforcement for mobile devices connected to a VPN gateway in accordance with embodiments of the present invention.

A flow chart of a particular embodiment of the presently disclosed method for providing security policy enforcement for mobile devices connecting to a VPN gateway is depicted in FIG. 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 5, a flow diagram of a particular embodiment of a method 200 for providing security policy enforcement for mobile devices connecting to a VPN gateway is shown. Method 200 starts with processing block 202 which discloses connecting a mobile device to a computer system. The mobile device may include a, a smart phone, a Personal Digital Assistant (PDA), a tablet, laptop computer or the like. Processing block 202 states the computer system has an active VPN tunnel with a VPN gateway. This VPN tunnel allows the computer system to communicate securely with the gateway even though the computer system and the gateway are on separate private networks.

Processing block 206 recites running, by the computer system, a security policy check on the mobile device. The security policy is used to check for computer viruses, worms and the like and may also verify that the latest versions of virus protection software have been run on the mobile device. Processing block 208 discloses the running a security policy check uses power and disk space of the computer. This is important as the mobile device typically has limited processing, memory, power and/or disk space, and to use it for the security policy checking would result in a less than optimal experience for the mobile device user. Processing block 210 recites that the running a security policy check is done by a policy checking agent. One example of a security policy agent is the Avaya EAC Agent, available from Avaya, Inc. of Basking Ridge, N.J.

Processing continues with processing block 212 which states determining whether the mobile device passed the security policy check and when the mobile device does pass the security policy check, issuing a certificate to the mobile device. As described above, this certificate is not to verify the identity of the mobile device user, but instead is proof that the mobile device has passed security policy testing at the time specified in the certificate, and therefore should not pose a security risk when the mobile device attempts to connect to a VPN. the time is important because the VPN Gateway needs to examine when the check was done. Depending on its policy, if a check was done longer than expected period, it will be rejected. For example, a VPN gateway may have a policy that only accept certificate issued within 2 weeks. This prevents people use a stale certificate forever. This policy can be done by either or both two methods below: 1. By setting an expatriation date when issuing the certificate. 2. By checking the time at authentication time.

As shown in processing block 214, the certificate includes encrypted information of a users account and device specific information. This is done to verify that the certificate is associated with this particular mobile device, and has not been transferred to a different mobile device, which may not have passed the security policy testing.

Processing block 216 recites using the certificate by the mobile device when the mobile device connects to a Virtual Private Network (VPN). Since the mobile device cannot run or support the policy testing without utilizing the limited battery and/or processing and storage capabilities of the mobile device, or the operating system of the mobile device does not allow background applications to be run, the certificate shows that the mobile device has previously passed the security policy testing when the mobile device was docked to a computer system which had an active VPN session running.

Processing block 218 discloses validating the certificate by a VPN gateway. As shown by processing block 220, the validating is based on contents of the certificate and on policies of the VPN gateway. This is done to verify that the certificate is associated with this particular mobile device, and has not been transferred to a different mobile device, which may not have passed the security policy testing. Additionally, the validating of the certificate may also be to insure the certificate has not expired.

Processing block 222 states utilizing the VPN by the mobile device. The mobile device is now able to safely and securely establish an active VPN tunnel with the VPN gateway. This VPN tunnel allows the mobile device to communicate securely with the gateway even though the mobile device and the gateway are on separate private networks.

Figure 6:
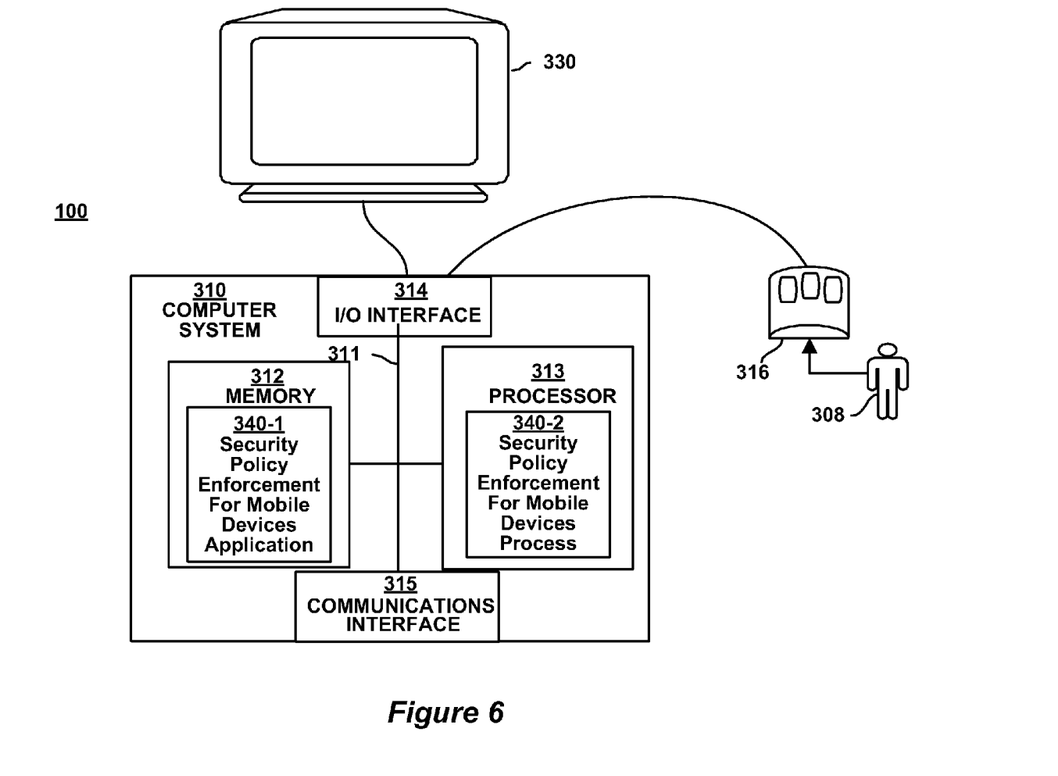
FIG. 6 illustrates an example computer system architecture for a computer system that performs security policy enforcement for mobile devices connected to a VPN gateway in accordance with embodiments of the invention.

FIG. 6 is a block diagram illustrating example architecture of a computer system 310 that executes, runs, interprets, operates or otherwise performs a secure policy enforcement for a mobile device operating application 340-1 and secure policy enforcement for a mobile device operating process 340-2 suitable for use in explaining example configurations disclosed herein. The computer system 310 may be any type of computerized device such as a personal computer, workstation, portable computing device, console, laptop, network terminal or the like. An input device 316 (e.g., one or more customer/developer controlled devices such as a keyboard, mouse, etc.) couples to processor 313 through I/O interface 314, and enables a customer 308 to provide input commands, and generally control the graphical customer interface 360 that the secure policy enforcement for a mobile device operating application 340-1 and process 340-2 provides on the display 330. As shown in this example, the computer system 310 includes an interconnection mechanism 311 such as a data bus or other circuitry that couples a memory system 312, a processor 313, an input/output interface 314, and a communications interface 315. The communications interface 315 enables the computer system 310 to communicate with other devices (i.e., other computers) on a network (not shown).

The memory system 312 is any type of computer readable medium, and in this example, is encoded with a secure policy enforcement for a mobile device operating application 340-1 as explained herein. The secure policy enforcement for a mobile device operating application 340-1 may be embodied as software code such as data and/or logic instructions (e.g., code stored in the memory or on another computer readable medium such as a removable disk) that supports processing functionality according to different embodiments described herein. During operation of the computer system 310, the processor 313 accesses the memory system 312 via the interconnect 311 in order to launch, run, execute, interpret or otherwise perform the logic instructions of a secure policy enforcement for a mobile device operating application 340-1. Execution of a secure policy enforcement for a mobile device operating application 340-1 in this manner produces processing functionality in the secure policy enforcement for a mobile device operating process 340-2. In other words, the secure policy enforcement for a mobile device operating process 340-2 represents one or more portions or runtime instances of a secure policy enforcement for a mobile device operating application 340-1 (or the entire a secure policy enforcement for a mobile device operating application 340-1) performing or executing within or upon the processor 313 in the computerized device 310 at runtime.

It is noted that example configurations disclosed herein include the secure policy enforcement for a mobile device operating application 340-1 itself (i.e., in the form of un-executed or non-performing logic instructions and/or data).

The secure policy enforcement for a mobile device operating application 340-1 may be stored on a computer readable medium (such as a floppy disk), hard disk, electronic, magnetic, optical, or other computer readable medium. Normally the policy is permanently stored on VPN Gateway (or server connected to it). At check time, the policy will be pushed from Gateway (or server) to the client (or agent) side. The policy is usually flushed after user disconnect the VPN.

A secure policy enforcement for a mobile device operating application 340-1 may also be stored in a memory system 312 such as in firmware, read only memory (ROM), or, as in this example, as executable code in, for example, Random Access Memory (RAM). In addition to these embodiments, it should also be noted that other embodiments herein include the execution of a secure policy enforcement for a mobile device operating application 340-1 in the processor 313 as the secure policy enforcement for a mobile device operating process 340-2. Those skilled in the art will understand that the computer system 310 may include other processes and/or software and hardware components, such as an operating system not shown in this example.

A display 330 need not be coupled directly to computer system 310. For example, the secure policy enforcement for a mobile device operating application 340-1 can be executed on a remotely accessible computerized device via the network interface 315. In this instance, the graphical customer interface 360 may be displayed locally to a customer 308 of the remote computer, and execution of the processing herein may be client-server based.

During operation, processor 313 of computer system 300 accesses memory system 312 via the interconnect 311 in order to launch, run, execute, interpret or otherwise perform the logic instructions of the secure policy enforcement for a mobile device application 340-1. Execution of secure policy enforcement for a mobile device application 340-1 produces processing functionality in secure policy enforcement for a mobile device process 340-2. In other words, the secure policy enforcement for a mobile device process 340-2 represents one or more portions of the secure policy enforcement for a mobile device application 340-1 (or the entire application) performing within or upon the processor 313 in the computer system 300.

It should be noted that, in addition to the secure policy enforcement for a mobile device process 340-2, embodiments herein include the secure policy enforcement for a mobile device application 340-1 itself (i.e., the un-executed or non-performing logic instructions and/or data). The secure policy enforcement for a mobile device application 340-1 can be stored on a computer readable medium such as a floppy disk, hard disk, or optical medium. The secure policy enforcement for a mobile device application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of secure policy enforcement for a mobile device application 340-1 in processor 313 as the secure policy enforcement for a mobile device process 340-2. Those skilled in the art will understand that the computer system 300 can include other processes and/or software and hardware components, such as an operating system that controls allocation and use of hardware resources associated with the computer system 300.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), tablets or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
   connecting a mobile device to a computer wherein said computer system has an active VPN tunnel with a VPN gateway;
   running, by said computer system, a security policy check on said mobile device;
   determining whether said mobile device passed said security policy check and when said mobile device does pass said security policy check, issuing a certificate to said mobile device; and
   using said certificate by said mobile device when said mobile device connects to a Virtual Private Network (VPN);
   wherein said connecting a mobile device to said computer system comprises docking said mobile device to said computer system such that said running said security check is done without taxing resources of said mobile device.

2. The method of claim 1 further comprising validating said certificate by a VPN gateway.

3. The method of claim 2 wherein said validating is based on contents of said certificate and on policies of said VPN gateway.

4. The method of claim 2 further comprising utilizing said VPN by said mobile device.

5. The method of claim 1 wherein said running a security policy check uses battery power, memory, processing power and disk space of said computer system.

6. The method of claim 1 wherein said certificate includes encrypted information of a user's account.

7. The method of claim 1 wherein said running a security policy check is done by a policy checking agent installed on said computer system.

8. A non-transitory computer readable storage medium having computer readable code thereon for providing security policy enforcement for a mobile device, the medium including instructions in which a computer system performs operations comprising:
   connecting a mobile device to said computer system wherein said computer system has an active VPN tunnel with a VPN gateway;
   running, by said computer system, a security policy check on said mobile device;
   determining whether said mobile device passed said security policy check and when said mobile device does pass said security policy check, issuing a certificate to said mobile device; and
   wherein said certificate is used by said mobile device when said mobile device connects to a Virtual Private Network (VPN);
   wherein said connecting a mobile device to said computer system comprises docking said mobile device to said computer system such that said running said security check is done without taxing resources of said mobile device.

9. The computer readable storage medium of claim 8 further comprising validating said certificate by a VPN gateway.

10. The computer readable storage medium of claim 9 wherein said validating is based on contents of said certificate and on policies of said VPN gateway.

11. The computer readable storage medium of claim 9 further comprising utilizing said VPN by said mobile device.

12. The computer readable storage medium of claim 8 wherein said running a security policy check uses battery power, memory, processing power and disk space of said computer system.

13. The computer readable storage medium of claim 8 wherein said certificate includes encrypted information of a user's account.

14. The computer readable storage medium of claim 8 wherein said running a security policy check is done by a policy checking agent installed on said computer system.

15. A computer system comprising:
   a memory;
   a processor;
   a communications interface;
   an interconnection mechanism coupling the memory, the processor and the communications interface; and
   wherein the memory is encoded with an application providing secure policy enforcement for mobile devices, that when performed on the processor, provides a process for processing information, the process causing the computer system to perform the operations of: connecting to a mobile device;
   running, by said computer system, a security policy check on said mobile device, wherein said computer system has an active VPN tunnel with a VPN gateway;
   determining whether said mobile device passed said security policy check and when said mobile device does pass said security policy check, issuing a certificate to said mobile device; and
   wherein said mobile device uses said certificate when said mobile device connects to a Virtual Private Network (VPN);
   wherein said connecting a mobile device to said computer system comprises docking said mobile device to said computer system such that said running said security check is done without taxing resources of said mobile device.

16. The computer system of claim 15 wherein said validating is based on contents of said certificate and on policies of said VPN gateway.

17. The computer system of claim 15 wherein said certificate includes encrypted information of a user's account.

* * * * *